United States Patent
Chang et al.

(10) Patent No.: US 10,094,970 B1
(45) Date of Patent: Oct. 9, 2018

(54) LIGHT-EMITTING APPARATUS

(71) Applicant: OPTO TECH CORPORATION, Hsinchu County (TW)

(72) Inventors: Chien-Feng Chang, Hsinchu (TW); Tsung-Huai Lee, Hsinchu (TW); Ying-Chieh Peng, Hsinchu (TW); Ying-Jen Lai, Hsinchu (TW)

(73) Assignee: Opto Tech Corporation, Hsinchu County (TW)

( * ) Notice: Subject to any disclaimer, the term of this patent is extended or adjusted under 35 U.S.C. 154(b) by 0 days.

(21) Appl. No.: 15/618,549

(22) Filed: Jun. 9, 2017

(51) Int. Cl.
*F21V 7/04* (2006.01)
*F21V 8/00* (2006.01)

(52) U.S. Cl.
CPC ......... *G02B 6/0055* (2013.01); *G02B 6/0083* (2013.01); *G02B 6/0088* (2013.01)

(58) Field of Classification Search
CPC ... G02B 6/0055; G02B 6/0083; G02B 6/0088
See application file for complete search history.

(56) References Cited

U.S. PATENT DOCUMENTS

| | | | | |
|---|---|---|---|---|
| 2006/0044651 A1* | 3/2006 | Mimura | ................ | G02B 5/045 359/529 |
| 2015/0108364 A1* | 4/2015 | Hanai | ................... | F24F 3/166 250/423 R |
| 2015/0160407 A1* | 6/2015 | Hsiao | ............... | G02F 1/133308 349/65 |

FOREIGN PATENT DOCUMENTS

TW          M437916 U       9/2012

* cited by examiner

*Primary Examiner* — Ali Alavi
(74) *Attorney, Agent, or Firm* — Rosenberg, Klein & Lee

(57) ABSTRACT

The present invention relates to a light-emitting apparatus, which comprises at least one reflective housing, at least one light-emitting module, and a reflective member. The reflective housing includes a housing body and a curved surface part. The curved surface part is located on the housing body. The light-emitting module is located below the reflective housing. The light-emitting module includes a light guide plate and at least one light-emitting device. The light-emitting device is located on one side of the light guide plate. The light guide plate includes a plate body and a hole. The hole corresponds to an opening on the curved surface part and is located on the plate body. The reflective member is located below the light-emitting module. The reflective member includes a body and a light-emitting hole. The light-emitting hole corresponds to the hole and located on the body.

10 Claims, 9 Drawing Sheets

LIGHT-EMITTING APPARATUS

FIELD OF THE INVENTION

The present invention relates generally to a light-emitting apparatus, and particularly to a light-emitting apparatus formed by a light guide plate structure, a reflective housing structure, and a reflective member structure.

BACKGROUND OF THE INVENTION

The progress of technologies brings significant convenience for lives. In particular, the researches and improvements in the lighting technology enable tremendous color variations for lives. In recent years, light-emitting diodes (LEDs) have appeared, driving enormous progresses in the lighting technology. LEDs are semiconductor devices. Initially, they are applied to indicators and displays. Thanks to the introduction of white-light LEDs, LEDs can now be applied to lighting. They are novel light sources in the 21st century equipped with the advantages of high efficiency, long lifetime, and invulnerability to breakage. Thereby, traditional light sources are not comparable to LEDs. When a forward voltage is applied, LEDs can emit monochromatic and discontinuous light, which is a kind of electroluminescence. By altering the chemical compositions of the adopted semiconductor materials, LEDs can emit near-ultraviolet, visible, or infrared light.

The light emission of LEDs is characterized by straight-line emission. If LEDs are to be adopted as the lighting apparatus, optical lenses or optical microstructures should be used concurrently to alter the straight-lined light emitted by LEDs and result in scattered lighting effects. The optical lenses or optical microstructures can be fully reflective, half reflective, refractive, or scattering optical structures. In general, the light-emitting structures of LEDs can be categorized into edge-lit and direct-lit light-emitting structures. Currently, the edge-lit light-emitting structure is the mainstream structure.

According to the prior art, the light-emitting paths of edge-lit backlight modules can be roughly divided into two types. The first light-emitting path is that after the light emitted by LEDs passes through the light guide plate, it emits from the light-emitting surface directly. The second light-emitting path is that after the light emitted by LEDs passes through the light guide plate, it illuminates onto the reflective housing and then onto the light guide plate by reflection from the reflective housing. Finally, the light emits from the light-emitting surface via the light guide plate. By using the latter method, most light from LEDs will still emit via the light guide plate. Then the intensity of the light emitted from LEDs directly is high. If the light illuminates human eyes directly, glare will result.

The present invention improves the drawbacks of the prior are and provides a light-emitting apparatus with most emerging light being formed by single reflection. Accordingly, the light intensity is weaker than that of direct emission. Then the risk of injuring eyes is relatively lower.

SUMMARY

An objective of the present invention is to provide a light-emitting apparatus, which can reduce the light intensity and avoid glare by preventing light illumination into eyes.

Another objective of the present invention is to provide a light-emitting apparatus. By using the design of the light guide plate, the number of LEDs disposed surrounding the light guide plate can be reduced but still achieving identical luminance.

The present invention provides a light-emitting apparatus, which comprises one or more reflective housing, one or more light-emitting module, and a reflective member. The one or more reflective housing includes a housing body and a curved surface part. The curved surface part is located on the housing body. The one or more light-emitting module is located below the one or more reflective housing. The one or more light-emitting module includes a light guide plate and one or more light-emitting device. The one or more light-emitting device is located on one side of the light guide plate. The light guide plate includes a plate body and a hole. The hole corresponds to an opening on the curved surface part and is located on the plate body. The diameter of the hole is smaller than the diameter of the opening. The reflective member is located below the one or more light-emitting module. The reflective member includes a body and a light-emitting hole. The light-emitting hole corresponds to the hole and is located on the body.

According to an embodiment of the present invention, the diameter of the hole is smaller than the diameter of the opening.

According to an embodiment of the present invention, the diameter of the hole is smaller than the diameter of the light-emitting hole.

According to an embodiment of the present invention, the surfaces of the one or more reflective housing and the reflective member facing the light guide plate are reflective strictures.

According to an embodiment of the present invention, the one or more reflective housing further includes a housing sidewall surrounding the periphery of the housing body and forming an accommodating cavity. The light guide plate is located inside the accommodating cavity.

According to an embodiment of the present invention, the plate body further includes an annular part and a plurality of light guide parts. The light guide part surrounds the annular part and is a V-shaped structure. Both ends of the V-shape structure are connected to the annular part. The one or more light-emitting device is disposed at the tip of the V-shaped structure.

According to an embodiment of the present invention, the plate body further includes an annular part and a plurality of light guide parts. The light guide part surrounds the annular part and is a projective structure. The projective structure is formed by extending a curved side and a straight side from the outer side of the annular part and the curved side is connected to the straight side. The one or more light-emitting device is disposed on the straight side.

According to an embodiment of the present invention, a shading member is further disposed on the sidewall of the light-emitting hole and the sidewall of the hole of the light guide plate.

According to an embodiment of the present invention, a circuit board is further included. The circuit board includes a circuit board body and a hole. The hole is located on the circuit board body. The circuit board is disposed between the one or more reflective housing and the light guide plate. The hole corresponds to the opening. Besides, the diameter of the hole is identical to the diameter of the opening. The one or more light-emitting device is disposed on the circuit board body and located on one side of the light guide plate.

According to an embodiment of the present invention, a circuit board is further included. The circuit board includes a circuit board body and a hole. The hole is located on the circuit board body. The circuit board is disposed between the light guide plate and the body. The hole corresponds to the light-emitting hole. Besides, the diameter of the hole is identical to the diameter of the light-emitting hole. The one or more light-emitting device is disposed on the circuit board body and located on one side of the light guide plate.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
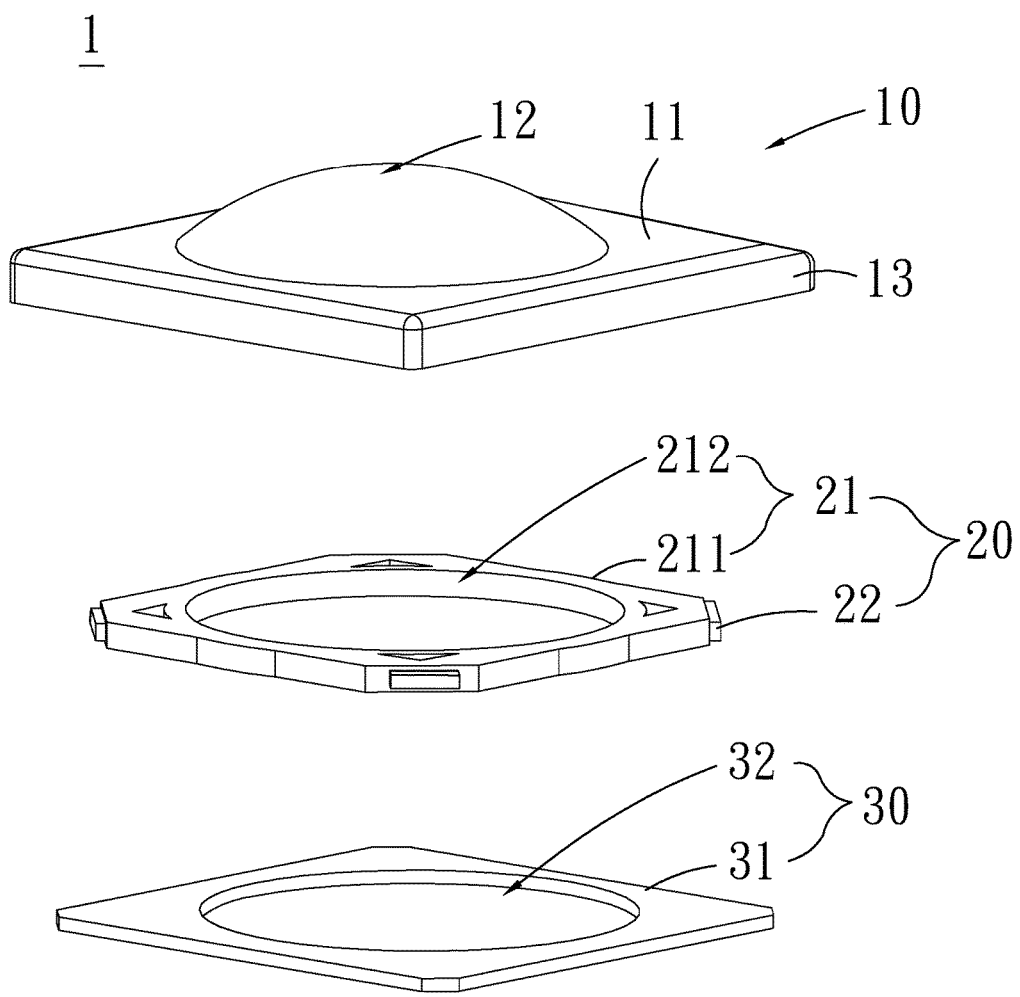
FIG. 1 shows a stereoscopic exploded view of the light-emitting apparatus according to the first embodiment.
Figure 2:
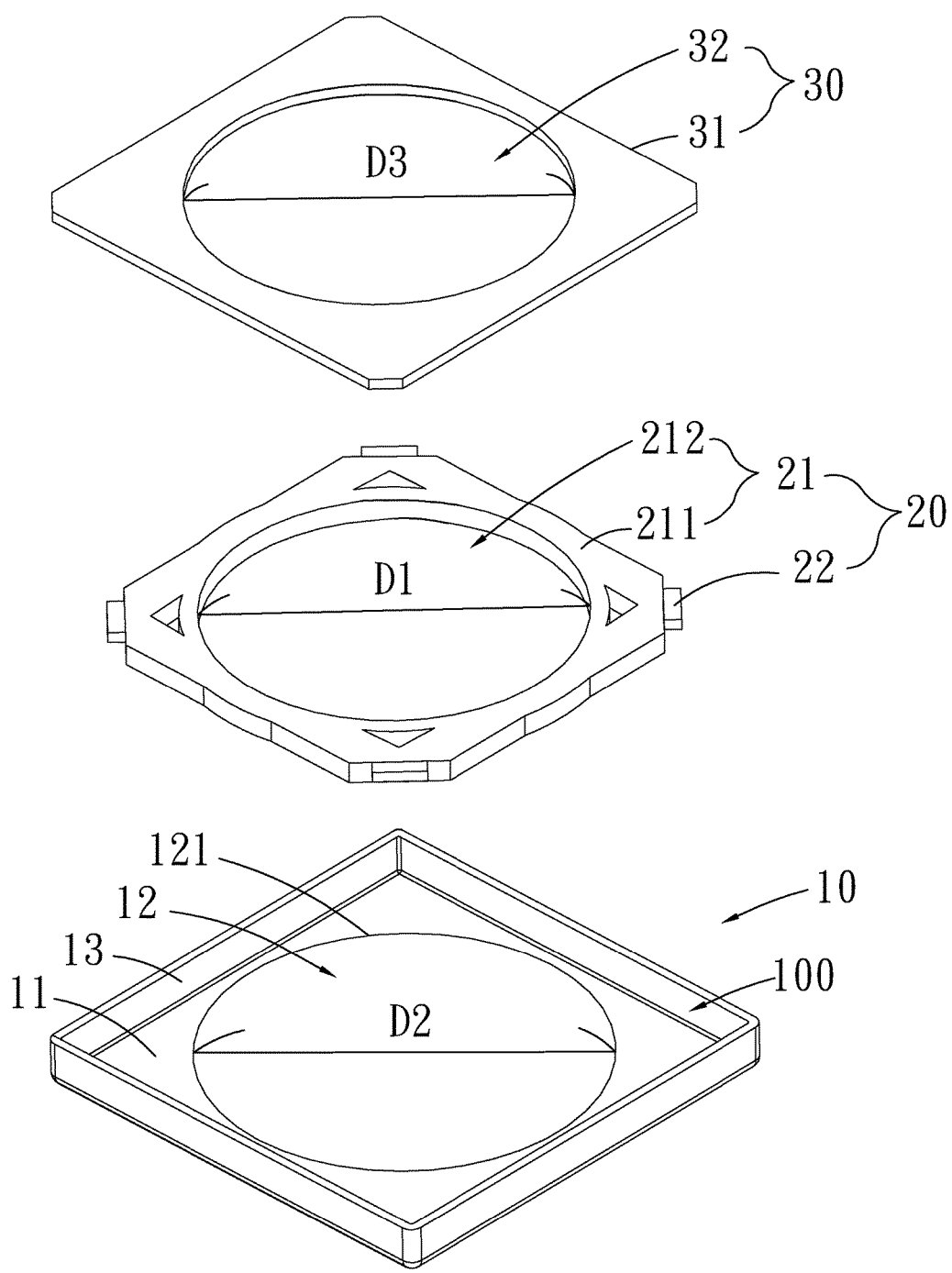
FIG. 2 shows a bottom-up stereoscopic exploded view of the light-emitting apparatus according to the first embodiment.

Please refer to FIG. 1 and FIG. 2, which show a stereoscopic exploded view and a bottom-up stereoscopic exploded view of the light-emitting apparatus according to the first embodiment. As shown in the figures, the present embodiment provides a light-emitting apparatus 1 for lighting applications. Because the light intensity of LEDs is high, once the light enters human eyes directly, glare will result. The light-emitting apparatus 1 according to the present embodiment comprises one or more light-emitting device therein. Most of the light emitted by the one or more light-emitting device needs to be reflected prior to lighting the exterior. The structural design of the light-emitting apparatus 1 according to the present embodiment can improve the glare as described above. In addition, the shape is a semispherical shell, which is distinct from past designs.

The light-emitting apparatus 1 according to the present embodiment comprises one or more reflective housing 10, one or more light-emitting module 20, and a reflective member 30. The one or more reflective housing 10 includes a housing body 11 and a curved surface part 12. The curved surface part 12 is located on the housing body 11. The one or more light-emitting module 20 is located below the one or more reflective housing 10. The one or more light-emitting module 20 includes a light guide plate 21 and one or more light-emitting device 22. The one or more light-emitting device 22 is located on one side of the light guide plate 21. The light guide plate 21 includes a plate body 211 and a hole 212. The hole 212 corresponds to an opening 121 on the curved surface part 12 and is located on the plate body 211. The diameter D1 of the hole 212 is smaller than the diameter D2 of the opening 121. The reflective member 30 is located below the one or more light-emitting module 20. The reflective member 30 includes a body 31 and a light-emitting hole 32. The light-emitting hole 32 corresponds to the hole 212 and is located on the body 31. The light-emitting hole 32 is larger than the hole 212.

In addition, the light guide plate 21 is sandwiched between the one or more reflective housing 10 and the body 31. The surfaces of the one or more reflective housing 10 and the reflective member 30 facing the light guide plate 21 are reflective strictures. Besides, the one or more reflective housing 10 further includes a housing sidewall 13 surrounding the periphery of the housing body 11 and forming an accommodating cavity 100. The light guide plate 21 is located inside the accommodating cavity.

Figure 3:
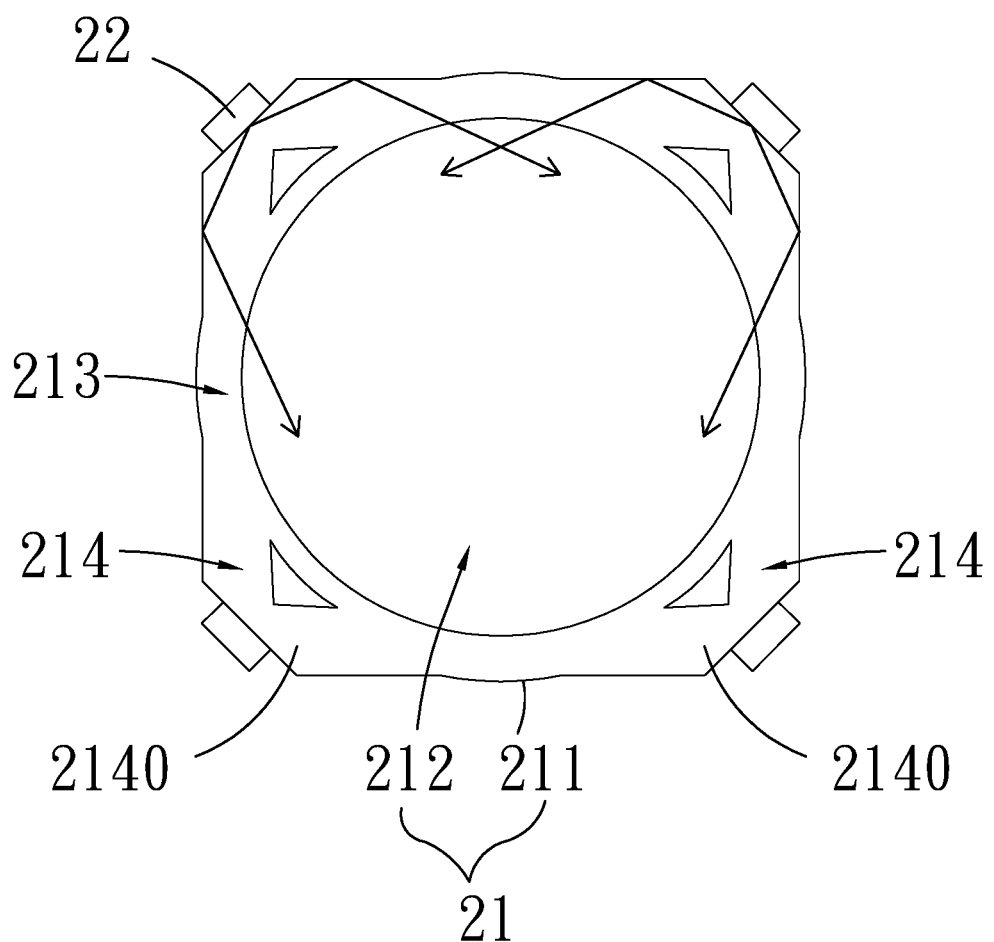
FIG. 3 shows a schematic diagram of the light paths of the light guide plate according to the first embodiment.

Please refer to FIG. 3, which shows a schematic diagram of the light paths of the light guide plate according to the first embodiment. As shown in the figure, the light guide plate 21 according to the present embodiment includes the plate body 211 and the hole 212. The hole 212 is located at the center of the plate body 211. The hole 212 is a circular hole. The plate body 212 is annular and further includes an annular par 212 and a plurality of light guide parts 214. The plurality of light guide parts 214 surround the annular part 213. The light guide part 214 is a V-shaped structure 2140 with both ends connected to the annular part 213. The one or more light-emitting device 22 is disposed at the tip of the V-shaped structure 2140. According to the present embodiment, the light guide plate 21 includes an annular part 213 and four light guide parts 214. The four light guide parts 214 are disposed evenly on the periphery of the annular part 213 and thus forming the light guide plate 21 close to a rectangle, as shown in FIG. 3.

Figure 4A:
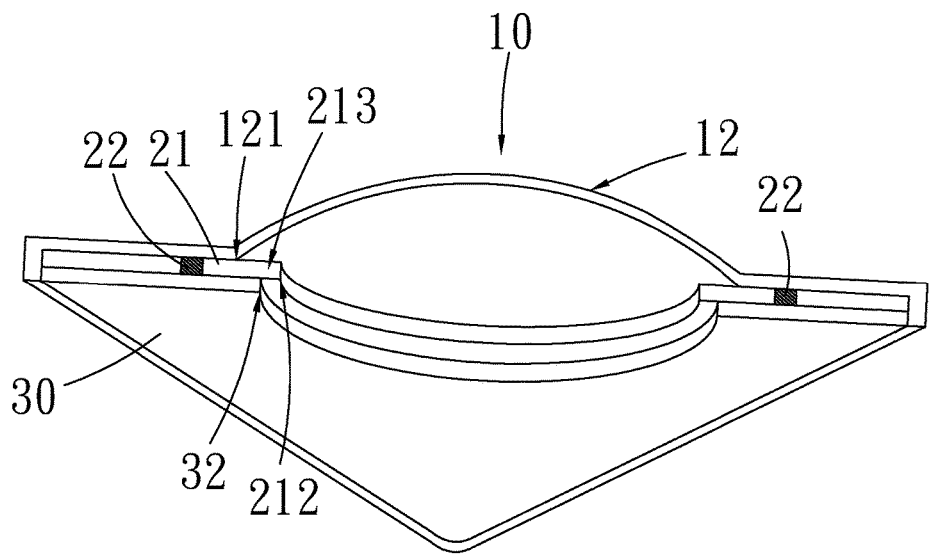
FIG. 4A shows a stereoscopic cross-sectional view of the light-emitting apparatus according to the first embodiment.
Figure 4B:
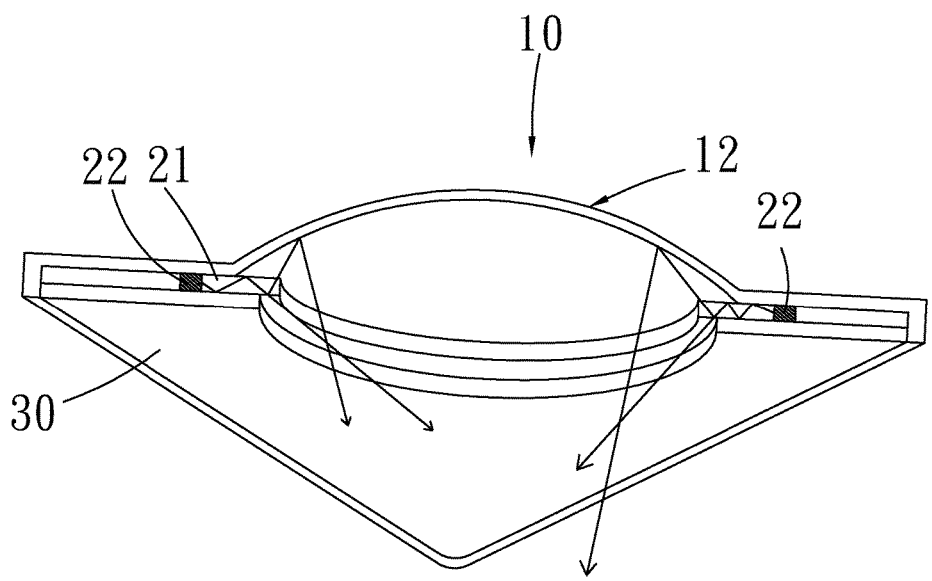
FIG. 4B shows light paths of the light-emitting apparatus according to the first embodiment.

Please refer to FIGS. 4A and 4B, which show a stereoscopic cross-sectional view and light paths of the light-emitting apparatus according to the first embodiment. As shown in the figures, the one or more light-emitting device 22 of the light-emitting apparatus 1 emits light, which enters the tip of the V-shaped structure 2140 of the light guide part 214. The light paths lead to both ends of the V-shaped structure 2140, respectively. Then, the light follows the paths and enters the annular part of the light guide plate 21, enabling the light of the one or more light-emitting device 22 to be concentrated to the annular part 213. Please refer to FIG. 2, the diameter D1 of the hole 212 of the light guide plate 21 is smaller than the diameter D2 of the opening 121 of the one or more reflective housing 10 and the diameter D3 of the light-emitting hole 32 of the reflective member 30. In other words, the inner part of the annular part 213 of the light guide plate 21 projects and is exposed to the opening 121 and the light-emitting hole 32. Thereby, the light of the one or more light-emitting device 22 will be concentrated and emit from the inner side of the annular part 213. A part of the light will be guided outwards directly and will be reflected in the light guide plate 21 for multiple times, weakening the light intensity. On the other hand, the rest part of the light illuminates the curved surface part 12 of the one or more reflective housing 10. The curved surface part 12 reflects the light outwards, making the light pass through the hole 212 of the light guide plate 11. Finally, the light emits from the light-emitting hole 32 of the reflective member 30.

The present embodiment improves the drawbacks in the prior art. According to the prior art, because the light intensity of LEDs is high. If the light illuminates human eyes directly, glare will result easily. Accordingly, the present invention provides the light-emitting apparatus 1. Because most of the light emitted from the one or more light-emitting device 22 in the light-emitting apparatus 1 should be reflected once or for more times, the overall light intensity will be reduced. Moreover, the present embodiment mainly comprises the structure assembly formed by the one or more reflective housing 10, the light guide plate 20, and the reflective member 30, which is distinct from the appearance and structure of past light-emitting apparatuses. The present invention is endowed with more design styles. In addition, the required number of the one or more light-emitting device is lowered, resulting in reduction of the manufacturing cost.

Figure 5:
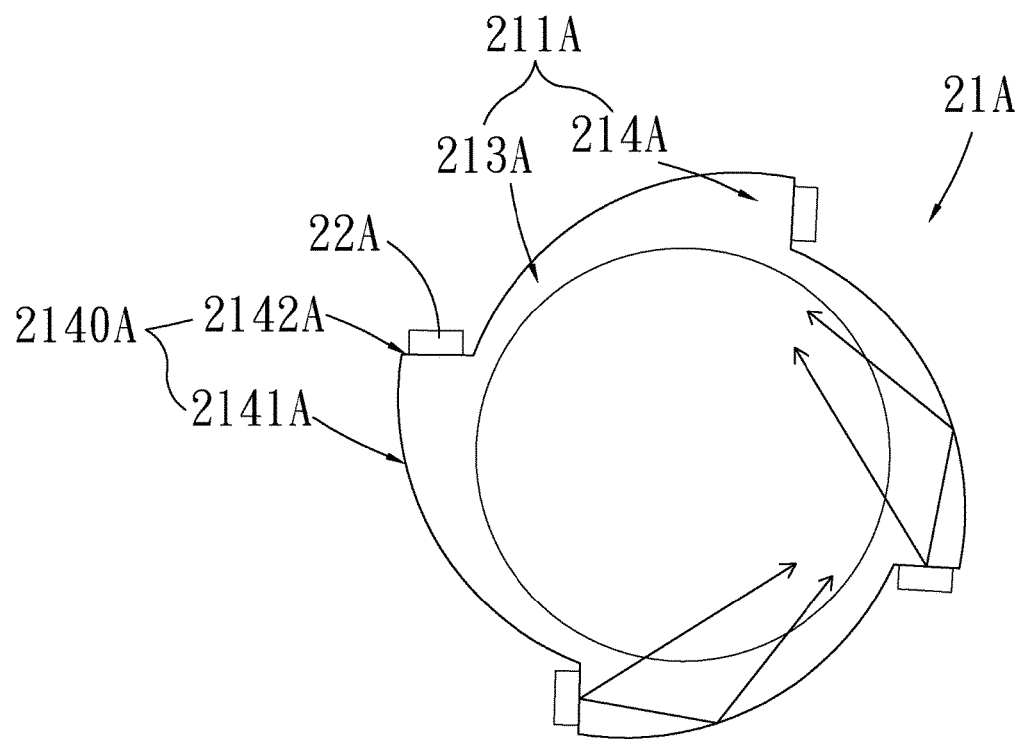
FIG. 5 shows light paths of the light-emitting apparatus according to the second embodiment.

Please refer to FIG. 5, which shows light paths of the light-emitting apparatus according to the second embodiment. As shown in the figure, the difference between the present embodiment and the first one is that the plate body 211A of the light guide plate 21A further includes an annular part 213A and a light guide part 214A. The light guide part 214 surrounds the annular part 213A. The light guide part 214A is a projective structure 2140A. The projective structure 2140A is formed by extending a curved side 2141A and a straight side 2142A from the outer side of the annular part 213A and the curved side 2141A is connected to the straight side 2142A. Besides, the one or more light-emitting device 22A is disposed on the straight side 2142A.

The light of the one or more light-emitting device 22A is incident to the light guide part 214 of the light guide plate 21A from the straight side 2142A. After illuminating the curved side 2141A, the light is reflected to the annular part 213A. By using structural design, the light of the one or more light-emitting device 22A can be concentrated by the light guide plate 21 to illuminate toward the direction of the annular part 213A. In addition, the structure of the light guide plate 11 can reduce the quantity of the one or more light-emitting device 13 to achieve the same lighting brightness. The usage of the structure of the light guide plate 21A according to the present embodiment is identical to the lighting method and light paths of the light guide plate 21 according to the first embodiment. Hence, the details will not be described again.

Figure 6A:
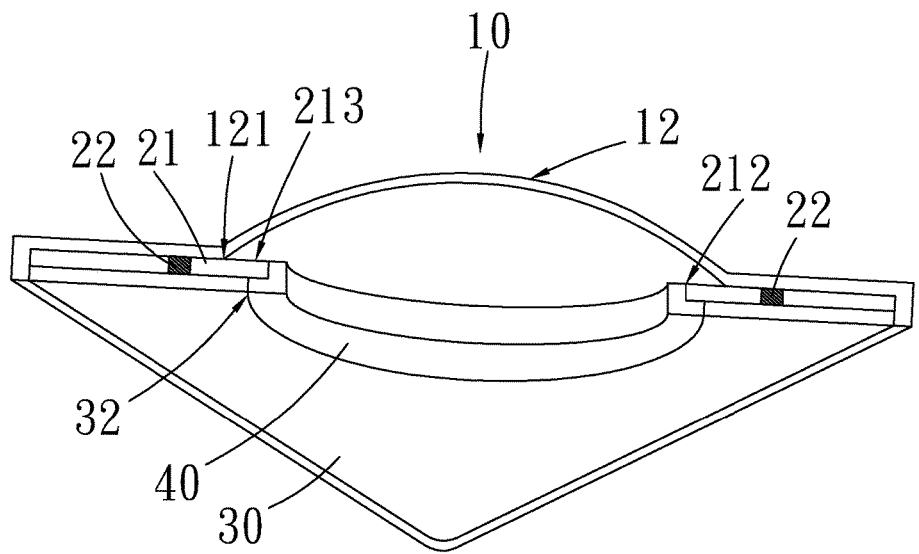
FIG. 6A shows a stereoscopic cross-sectional view of the light-emitting apparatus according to the third embodiment.
Figure 6B:
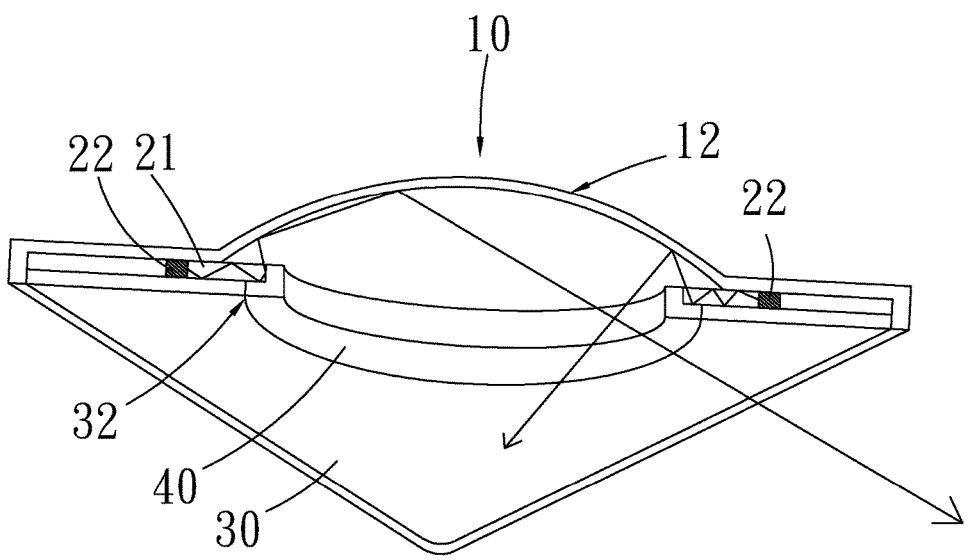
FIG. 6B shows light paths of the light-emitting apparatus according to the third embodiment.

Please refer to FIGS. 6A and 6B, which show a stereoscopic cross-sectional view and light paths of the light-emitting apparatus according to the third embodiment. As shown in the figures, the difference between the present embodiment and the first one is that the light-emitting apparatus 1 according to the present embodiment further comprises a shading member 40 disposed on the sidewall of the light-emitting hole 32 and the sidewall of the hole 212 of the light guide plate 21 for covering the light-emitting directions of the sidewall of the light-emitting hole 32 and the sidewall of the hole 212. Thereby, the inner side of the annular part 213 of the light guide plate 21 is projective and exposed in the opening 121 above. Then the light of the one or more light-emitting device 22 will emit collectively from the inner side of the annular part 213. All light will illuminate the curved surface part 12 of the one or more reflective housing 20. The curved surface part 12 reflects the light outwards and passing through the hole 212 of the light guide plate 11. Finally, the light emits from the light-emitting hole 32 of the reflective member 30. According to the present embodiment, all light emitted from the light-emitting apparatus 1 should be reflected by the one or more reflective housing 10.

Figure 7:
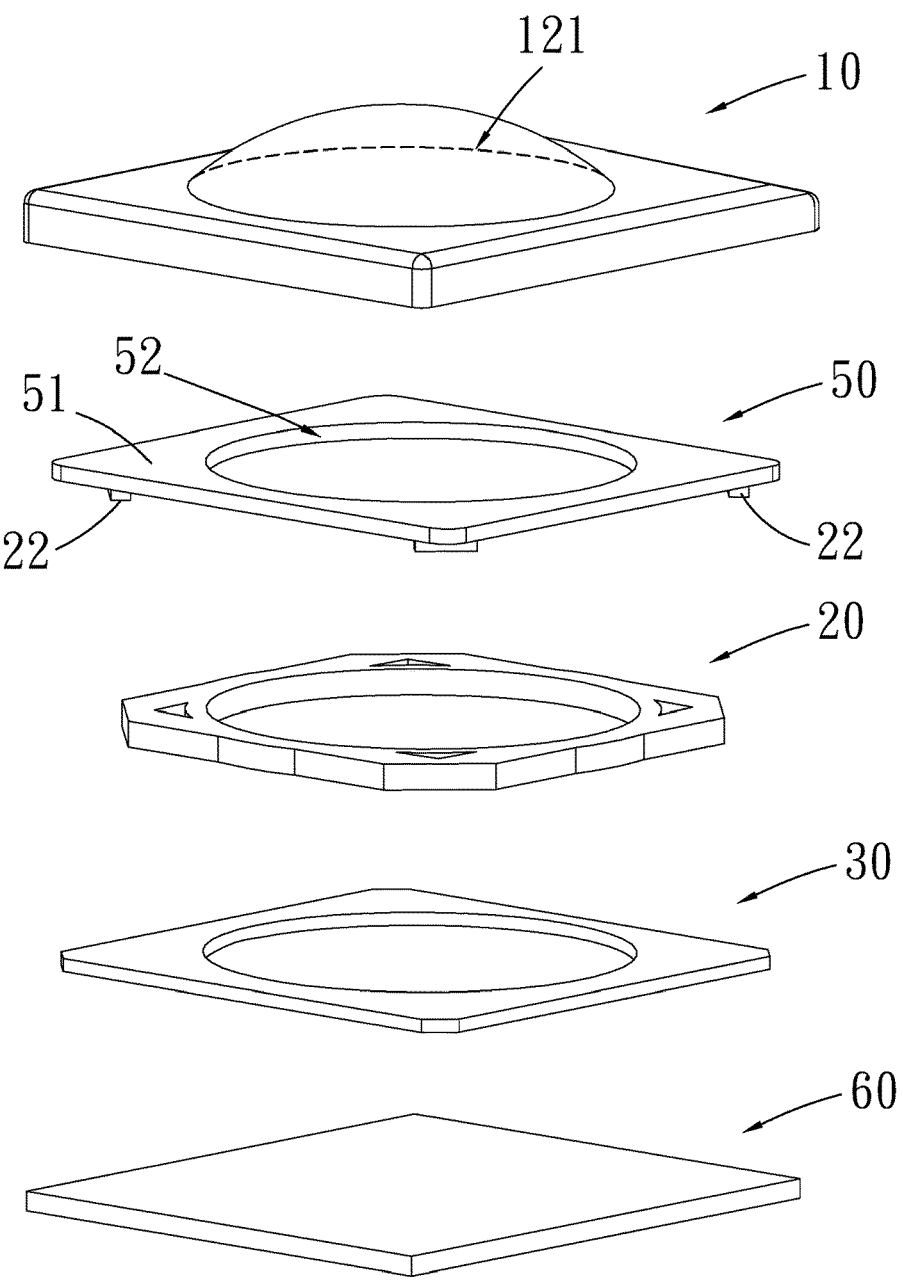
FIG. 7 shows a schematic diagram of the circuit board and the light plate according to the first embodiment of the present invention.
Figure 8:
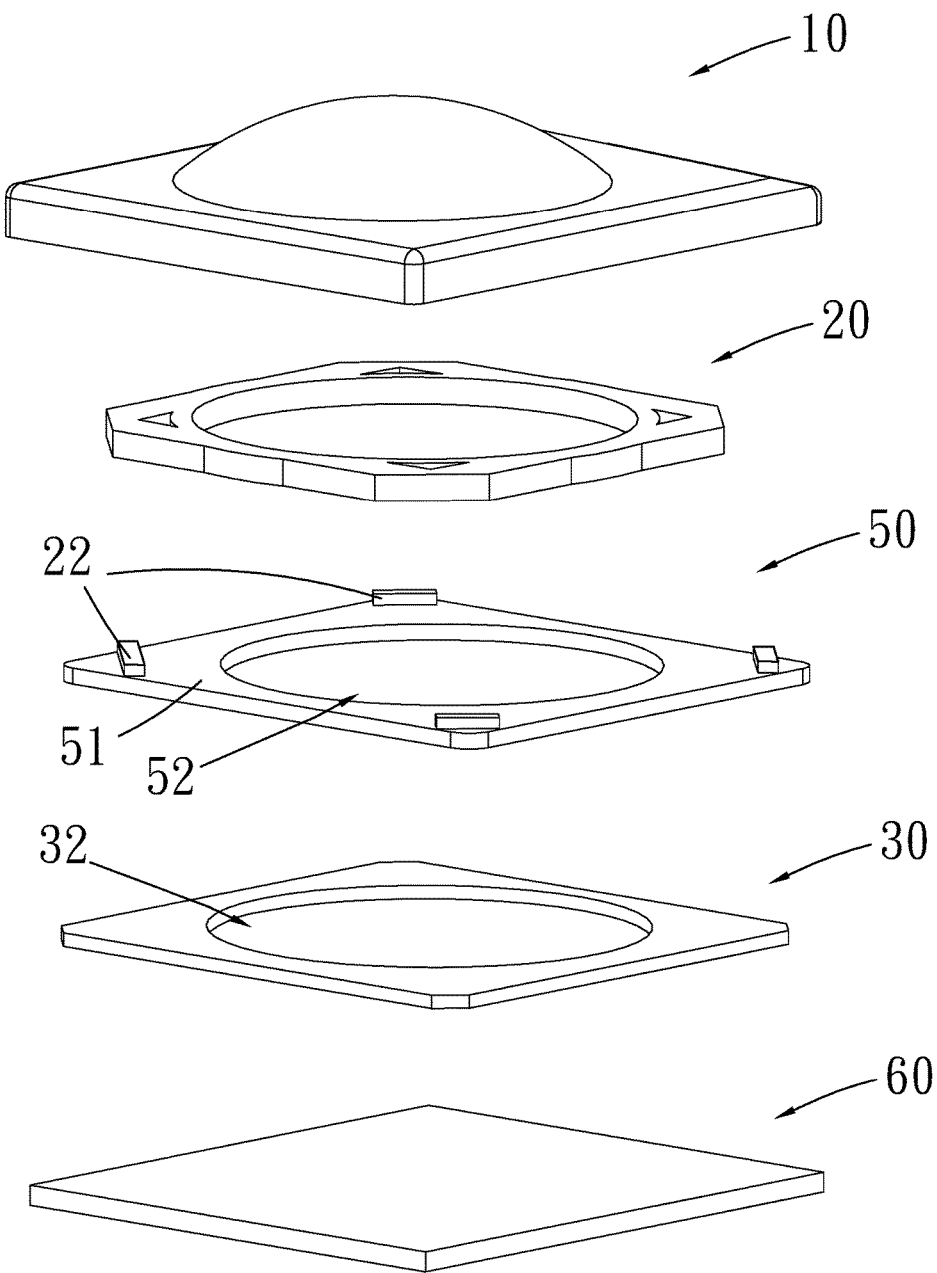
FIG. 8 shows a schematic diagram of the circuit board and the light plate according to the second embodiment of the present invention.

Please refer to FIG. 7 and FIG. 8, which show schematic diagrams of the circuit board and the light plate according to the first and second embodiments of the present invention. As shown in the figure, the light-emitting apparatus 1 according to the present embodiment further comprises a circuit board 50. The circuit board 50 includes a circuit board body 51 and a hole 52. The hole 52 is located on the circuit board body 51. The circuit board 50 is disposed between the one or more reflective housing 10 and the light guide plate 20. The hole 52 corresponds to the opening 121. Besides, the diameter of the hole 52 is identical to the diameter of the opening 121. The one or more light-emitting device 22 is disposed on the circuit board body 51 and located on one side of the light guide plate 21. Alternatively, the circuit board 50 is disposed between the light guide plate 21 and the body 30. The hole 52 corresponds to the light-emitting hole 32. Besides, the diameter of the hole 52 is identical to the diameter of the light-emitting hole 32. The one or more light-emitting device 22 is disposed on the circuit board body 51 and located on one side of the light guide plate 21. The disposition of the one or more light-emitting device 22 according to the present embodiment depends on users' requirements. The method for disposing the circuit board 50 is not limited. Alternatively, the one or more light-emitting device 22 can be disposed individually on one side of the light guide plate 21.

Moreover, the light-emitting apparatus 1 further comprises a light plate 60 disposed below the reflective member 30. After the light emitted from the light-emitting hole 32 of the reflective member 30 passes through the light plate 60, the uneven light can be equalized by refraction.

Figure 9:
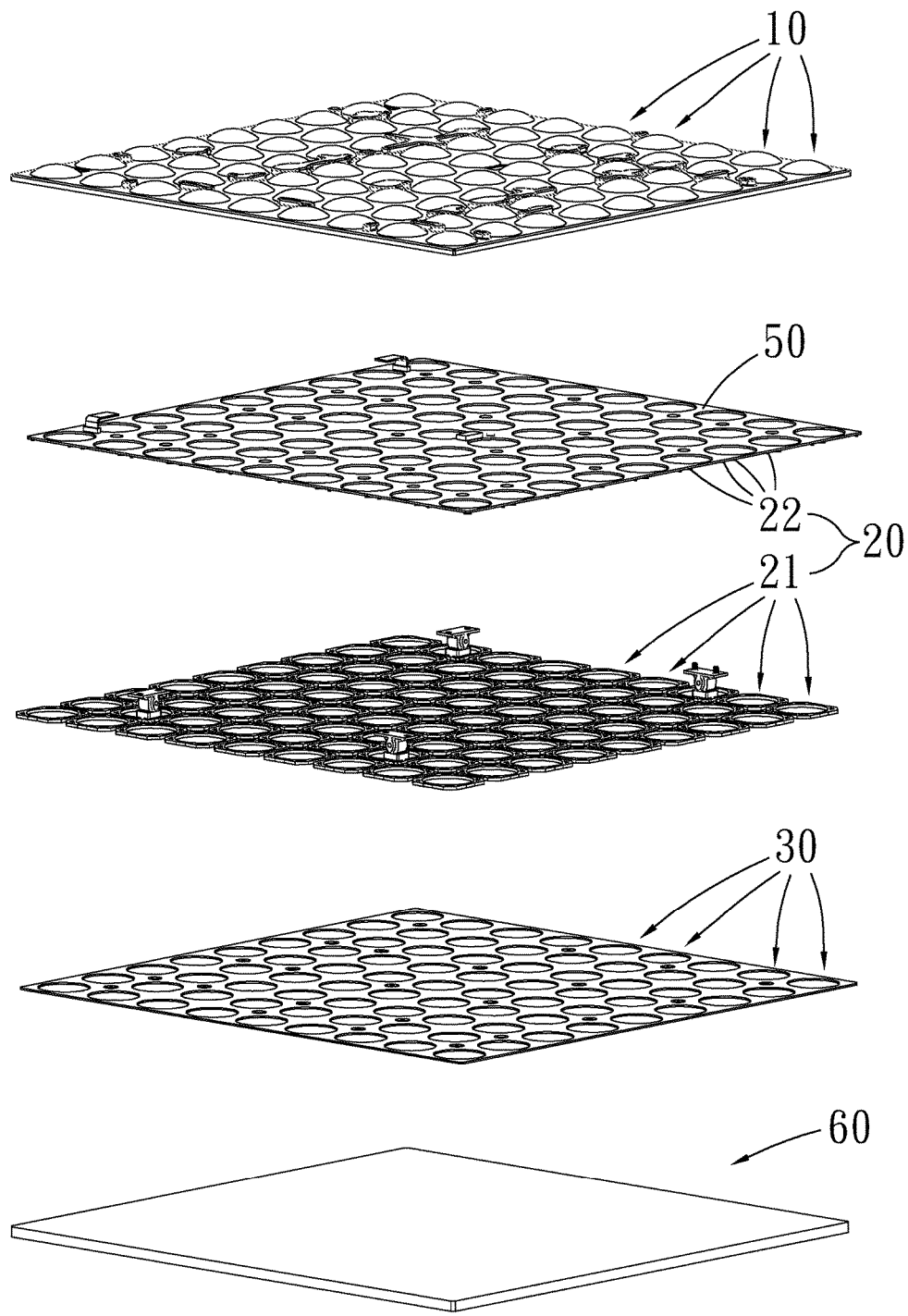
FIG. 9 shows a schematic diagram of the assembly lamp of the light-emitting apparatus according to the present invention.

Please refer to FIG. 9, which shows a schematic diagram of the assembly lamp of the light-emitting apparatus according to the present invention. As shown in the figure, the one or more reflective housing 10 according to the present embodiment includes a plurality of reflective housings 10; the one or more light-emitting module 20 includes a plurality of light-emitting modules 20; and the reflective member 30 includes a plurality of reflective members 30. After the above components are arranged and assembled to respective plate bodies, they are assembled in the same way as the first embodiment. Then light-emitting apparatus 1 forms a structure of panel light source. In addition, the circuit board 50 and the light plate 60 can be assembled into the present embodiment in the same way as the previous embodiments. The details will not be described again.

To sum up, the light-emitting apparatus according to the present invention comprises one or more reflective housing, one or more light-emitting module, and a reflective member. The reflective housing includes a housing body and a curved surface part. The curved surface part is located on the housing body. The light-emitting module is located below the reflective housing. The light-emitting module includes a light guide plate and one or more light-emitting device. The light-emitting device is located on one side of the light guide plate. The light guide plate includes a plate body and a hole. The hole corresponds to an opening on the curved surface part and is located on the plate body. The reflective member is located below the light-emitting module. The reflective member includes a body and a light-emitting hole. The light-emitting hole corresponds to the hole and located on the body. After the light from the light-emitting module illuminates the reflective housing, the light emits from the light-emitting hole of the reflective member for emitting light and lighting. Because most of the light emitted from the one or more light-emitting device in the light-emitting apparatus should be reflected once or for more times, the overall light intensity will be reduced. Besides, the structural design of the present embodiment is distinct from the appearance and structure of past light-emitting apparatuses. The present invention is endowed with more design styles. In addition, the required number of the one or more light-emitting device is lowered, resulting in reduction of the manufacturing cost.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A light-emitting apparatus, comprising:
   at least one reflective housing, having a housing body and a curved surface part, said curved surface part located on said housing body;
   at least one light-emitting module, located below said reflective housing, having a light guide plate and at least one light-emitting device, said light-emitting device located on one side of said light guide plate, said light guide plate having a plate body and a hole, and said hole corresponding to an opening of said curved surface part and located on said plate body; and
   a reflective member, located below said light-emitting module, having a body and a light-emitting hole, and said light-emitting hole corresponding to said hole and located on said body.

2. The light-emitting apparatus of claim 1, wherein the diameter of said hole is smaller than the diameter of said opening.

3. The light-emitting apparatus of claim 1, wherein the diameter of said hole is smaller than the diameter of said light-emitting hole.

4. The light-emitting apparatus of claim 1, wherein the surfaces of said reflective housing and said reflective member facing said light guide plate are reflective structures.

5. The light-emitting apparatus of claim 1, wherein said reflective housing further includes a housing sidewall surrounding the periphery of said housing body and forming an accommodating cavity, and said light guide plate is located in said accommodating cavity.

6. The light-emitting apparatus of claim 1, wherein said plate body further includes:
   an annular part;
   a plurality of light guide parts, surrounding said annular part, being a V-shaped structure, having both ends connected to said annular part, and said light-emitting device disposed at the tip of said V-shaped structure.

7. The light-emitting apparatus of claim 1, wherein said plate body further includes:
   an annular part;
   a plurality of light guide parts, surrounding said annular part, being a projective structure, said projective structure formed by extending a curved side and a straight side from the outer side of said annular part, said curved side connected to said straight side, and said light-emitting device disposed on said straight side.

8. The light-emitting apparatus of claim 1, further comprising a shading member disposed on the sidewall of said light-emitting hole of said reflective member and the sidewall of said hole of said light guide plate.

9. The light-emitting apparatus of claim 1, further comprising a circuit board, having a circuit board body and a hole, said hole located on said circuit board body, said circuit board located between said one or more reflective housing and said light guide plate, said hole corresponding to said opening, the diameter of said hole identical to the diameter of said opening, and said light-emitting device disposed on said circuit board body and located on one side of said light guide plate.

10. The light-emitting apparatus of claim 1, further comprising a circuit board, having a circuit board body and a hole, said hole located on said circuit board body, said circuit board located between said light guide plate and said body, said hole corresponding to said light-emitting hole, the diameter of said hole identical to the diameter of said light-emitting hole, and said light-emitting device disposed on said circuit board body and located on one side of said light guide plate.

* * * * *